United States Patent

Csipkes et al.

[11] Patent Number: 6,122,936
[45] Date of Patent: Sep. 26, 2000

[54] APPARATUS FOR INTEGRATING STEPS OF A PROCESS FOR INTERCONNECTING OPTICAL FIBERS

[75] Inventors: Andrei Csipkes, Savage; William Keith Chandler, Woodsboro; Waqar Mahmood, Odenton, all of Md.

[73] Assignee: Ciena Corporation, Linthicum, Md.

[21] Appl. No.: 09/048,331

[22] Filed: Mar. 26, 1998

[51] Int. Cl.⁷ .............................. G01J 1/42; C03C 25/00
[52] U.S. Cl. ............................................. 65/485; 65/501
[58] Field of Search .......................... 65/484, 485, 501; 395/82, 85, 88, 94; 414/4, 273, 274, 281

[56] References Cited

U.S. PATENT DOCUMENTS

| | | | |
|---|---|---|---|
| 4,763,272 | 8/1988 | McLandrich | 364/468.24 |
| 5,871,559 | 2/1999 | Bloom | 65/501 |

*Primary Examiner*—Sean E Vincent
*Attorney, Agent, or Firm*—Jones and Volentine; David L. Soltz

[57] ABSTRACT

An apparatus for integrating steps of a process for interconnecting optical fibers. The apparatus contains a planar surface having a plurality of openings. A plurality of optical fiber processing modules are suspended within the plurality of openings, with each of the modules configured to execute a different step of the optical fiber interconnection process. A material transfer mechanism, such as a robot arm, is arranged above the planar surface and is connected to a controller. The apparatus can incorporate an optical fiber precision handling tool, which holds, transports and aligns the fibers to be processed. The robot arm is operative to pick-up and move the optical fiber precision handling tool between the plurality of modules. This allows the optical fibers to be transferred through a series of process steps without having to re-secure or re-orient the fibers between the steps.

19 Claims, 4 Drawing Sheets

APPARATUS FOR INTEGRATING STEPS OF A PROCESS FOR INTERCONNECTING OPTICAL FIBERS

BACKGROUND OF THE INVENTION

1. Field of the Invention

The present invention generally relates to an apparatus for integrating steps of a process for interconnecting optical fibers, and more particularly, to an optical workstation that is used for facilitating the automated handling of optical fibers throughout the various process steps for interconnecting optical fibers, such as in a fusion process or in a connectorization process.

2. Description of the Related Art

Optical fibers are very light, very fragile, and have very small dimensions. During their initial manufacture, there are practical limitations on the lengths of optical fibers that can be drawn. Therefore, the connections between the fibers to create longer designated lengths of fiber are accomplished by splicing. In addition, optical fibers or optical devices must be connected to pieces of terminal equipment, such as optical transmitters and optical receivers, to create functioning optical systems.

Direct fiber-to-fiber splicing can be accomplished using mechanical splicing devices or by fusing the glass fiber ends together by means of a flame or electric arc. The nature of the fibers themselves, both in the material used in their fabrication and in the minute physical dimensions involved, combined with submicron alignment requirements, make fiber splicing more difficult than conventional metallic conductor splicing. Problems with efficient transfer of energy, minimized optical reflections, and mechanical integrity must be addressed when splicing optical fibers. The complexities of interconnecting the fibers demands careful attention to connector design and a high level of precision in fiber splices.

For example, present day optical fiber splicing operations require numerous steps, including stripping, cleaning, cleaving, aligning, splicing, recoating and pull-testing. While each of the individual steps can be performed somewhat quickly, the set-up, preparation and transfer time between the steps of the splicing process consumes a significant amount of time. For instance, the total time for the fusion splicing process is approximately one-half of the total time required for manufacturing a piece of optical transmission equipment.

Also, each of the steps are generally performed manually on a different apparatus or piece of manufacturing equipment. In addition, nearly all the set-up and preparation is performed manually, thereby increasing not only the amount of time for the process, but the possibility of human errors as well. Furthermore, human intervention also causes some deviation in splicing and connector uniformity across different technicians or different work groups.

Such time inefficiencies and lack of precise uniformity in performing the fusion and connectorization processes result in a reduced manufacturing output and a reduction in the quality of the fiber cable and optical systems.

Accordingly, there exists a need for an apparatus that can integrate the various steps of an optical fiber interconnection process, automate the handling and processing of the optical fibers during the optical fiber interconnection process, whether a fusion process or a connectorization process, in order to reduce the amount of manual intervention by an operator during the process steps and thereby increase the quantity and uniformity of the fiber cable and optical devices manufactured through the interconnection process.

There also exists a need for an apparatus and system for interconnecting optical fibers that may be readily updated to integrate enhancements or advancements in methods for executing certain steps of the interconnection process. Preferably, the enhancements should be easily integrated in the interconnection process without significant manufacturing downtime, and without a substantial investment in manpower or funds to integrate and implement the enhancement.

SUMMARY OF THE INVENTION

The present invention is therefore directed to an integrated and automated optical fiber interconnect workstation that substantially overcomes one or more of the problems due to the limitations and disadvantages of the conventional art.

In general, the present invention provides an integrated and automated workstation for performing optical fiber interconnection processes. The workstation provides an open architecture, whereby enhancements in certain portions or steps of the optical fiber interconnection process may be readily incorporated into the assembly process with a minimum amount of downtime or reconfiguration.

The workstation contains a planar surface having a plurality of openings. A plurality of optical fiber interconnect modules are provided within respective of the plurality of openings, with each of the modules being capable of executing a different step of an optical fiber interconnect process. For example, the modules can include means for preparation, fusion, connection, and testing of optical fiber interconnections. Image processing or quality control functions can also be incorporated in the apparatus or the modules.

An ergonomic robot arm or gantry system is arranged above the planar surface and is used to transfer an optical fiber precision handling tool, which aligns and orients optical fibers, between the respective plurality of optical processing modules. This allows the optical fibers to be transferred through a series of interconnect steps without having to re-secure or re-orient the fibers between the steps.

A manufacturing control system coordinates the functions of the robot, image processor, and the individual modules to carry out a particular optical fiber interconnection process.

BRIEF DESCRIPTION OF THE DRAWINGS

The foregoing and other objects, aspects and advantages will be described with reference to the drawings, in which.

DETAILED DESCRIPTION OF THE PREFERRED EMBODIMENTS

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the invention would be of significant utility without undue experimentation.

Figure 1:
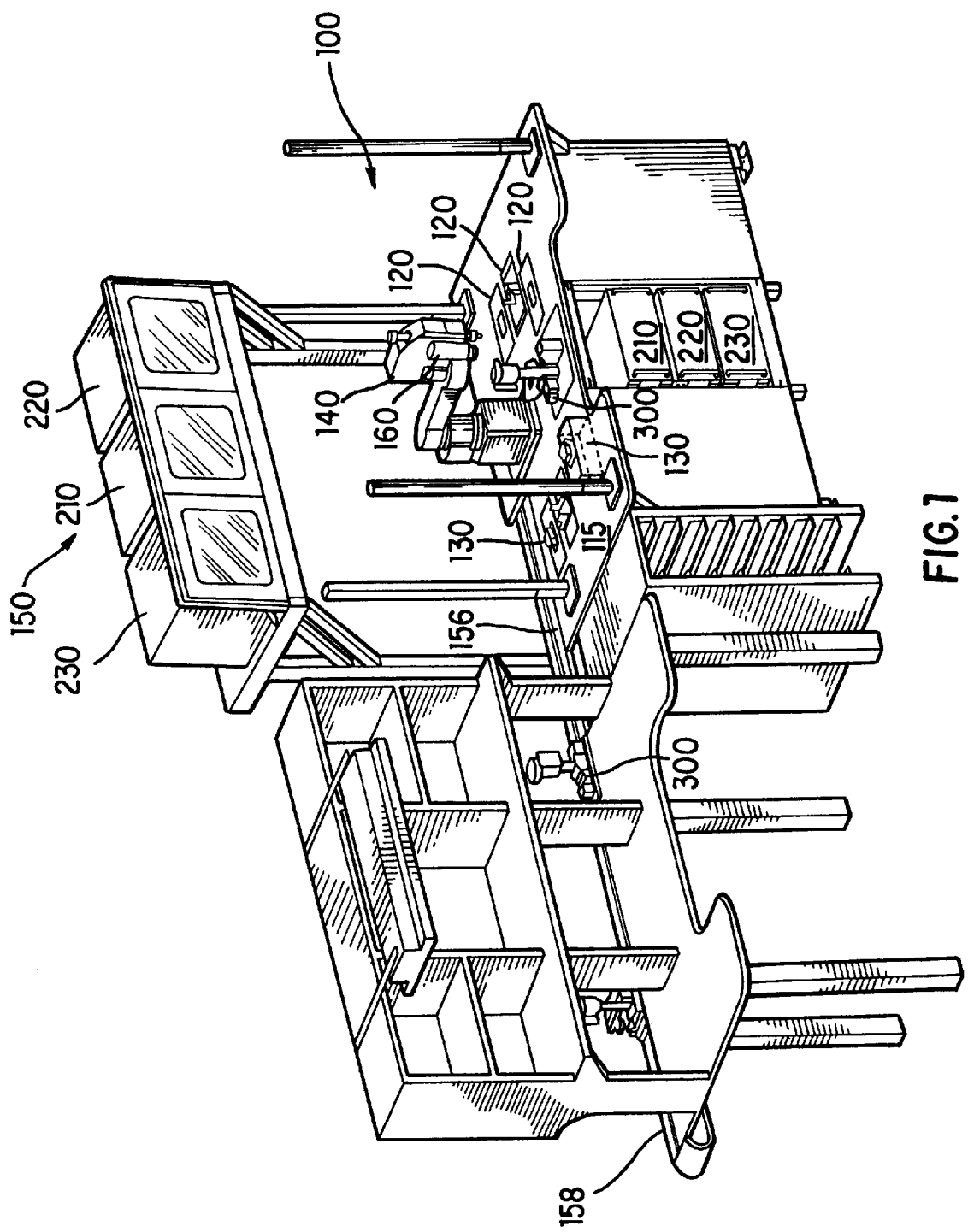
FIG. 1 is a perspective drawing of an integrated and automated optical fiber interconnect workstation in accordance with an embodiment of the present invention.

FIG. 1 is a perspective view of the optical fiber interconnect workstation 100 of the present invention that is used to integrate and automate certain portions of the optical fiber interconnect process, as well as facilitate handling of the optical fibers between steps of the process. An optical fiber precision handling tool, such as that disclosed in commonly assigned U.S. application Ser. No. 09/017,327, entitled "Optical Fiber Precision Handling Tool", filed Feb. 2, 1998, which is hereby incorporated by reference in its entirety, may be used with the optical fiber interconnect workstation as described in greater detail later. The optical fiber precision handling tool may be used to align and handle optical fibers between steps of the interconnection process. Pertinent portions of application Ser. No. 09/017,327 have been reproduced in appropriate sections below for convenience and ease of reference.

To better understand the operation of the optical fiber interconnect workstation 100, the general steps of an optical fiber fusion splicing process are described below. While the description below refers to an exemplary fusion process, one of ordinary skill in the art would realize that the integrated and automated optical fiber interconnect workstation (hereinafter "optical workstation") of the present invention can be adapted to perform any conventional fusion or connectorization process, including splicing of different types of fibers.

Briefly, by way of background, the optical fiber fusion process requires a number of steps as herein described. Note that most fibers are individually coated with one or two polymeric coatings, typically 65 to 185 $\mu$m in thickness, to preserve the intrinsic strength of the fiber and permit fiber handling. Accordingly, in a first stripping step, this protective coating must be removed, either mechanically, thermally, or by using a chemical solvent. Next, the stripped fiber ends are cleaned in an alcohol or other cleaning solution using an ultrasonic cleaner. Thereafter the fiber is cleaved by scribing the fiber with a diamond and carbide scribe to induce a break. The fiber ends are aligned and then undergo the actual fusion splicing step. After the splicing step, an ultraviolet (UV) recoat step is performed to cover the exposed stripped and spliced portions of the fiber with a polymer for protection against the outside environment. Finally, a pull-test is performed on the fibers to test the strength of the splice, usually with at least a 150 Kpsi pull being applied to the fibers.

The ability to conduct such a fiber splicing process with a yield of 95%, including splicing of dissimilar fibers, represents a substantial challenge to optical device manufacturers. In an effort to achieve this yield goal and to sustain such a yield goal over an extended period of time, the optical workstation described herein has been developed. Each of the components of the optical workstation contribute to reducing the set-up, preparation and execution time of the optical fiber interconnect operation, while dramatically increasing the yield.

As shown in FIG. 1, the automated optical workstation 100 comprises a planar work surface 115 having a plurality of openings 120. The openings 120 are provided to facilitate the incorporation of a plurality of optical fiber processing modules 130 that are disposed or suspended within respective of the plurality of openings 120. In FIG. 1, several different types of modules 130 are shown disposed within the openings 120. Note that any number of means may be used to fix the module 130 within the opening 120. For example, the module 130 can incorporate a lip portion that would rest on a ledge extending into the opening 120 to suspend the module 130 within the opening 120. Alternatively, the top plate of the module 130 can be made larger than the opening 120 to suspend the module 130 within the opening 120.

Loading and unloading docks or conveyors 156 and 158 are provided at or near the workstation 100. The loading dock 156 is used for fiber cassette preparation and sequencing before the optical interconnect processes are performed, and the unloading dock 158 is used to transfer the fiber cassette for optical testing after the optical interconnect processes are performed.

Each of the modules 130 is separately manufactured to execute one or more of the different steps of a typical optical fiber interconnection process, including either fusion or connectorization processes. Note that one of the modules 130 in FIG. 1 is represented as a cube-shaped structure (dashed lines) for ease of illustration. However, it is understood that any number of conventional or custom modules 130 may be incorporated into the openings 120 of the automated optical workstation 100 of the present invention, with the ultimate configuration or shape of the module 130 being determined by the connectorization process step executed by the module 130.

Moreover, the openings 120 are shown in a rectangular form for illustration purposes only, it being understood that other different shaped openings can be employed, depending on the optical processing step being performed and the shape of the module. In addition, although seven openings 120 are shown in FIG. 1, the exact number, placement and spacing of the openings 120 in the planar surface 115 can be altered within the scope of the present invention, depending on the interconnection task that will be performed.

The modularization of the process steps and the open architecture of the optical workstation are advantageous in that they allow for independent reconfiguration of the modules 130 as well as "plug and play" type modularity for the entire system. Also, enhancements in certain modules can be readily incorporated by simply swapping out the enhanced module for the prior module.

Figure 2:
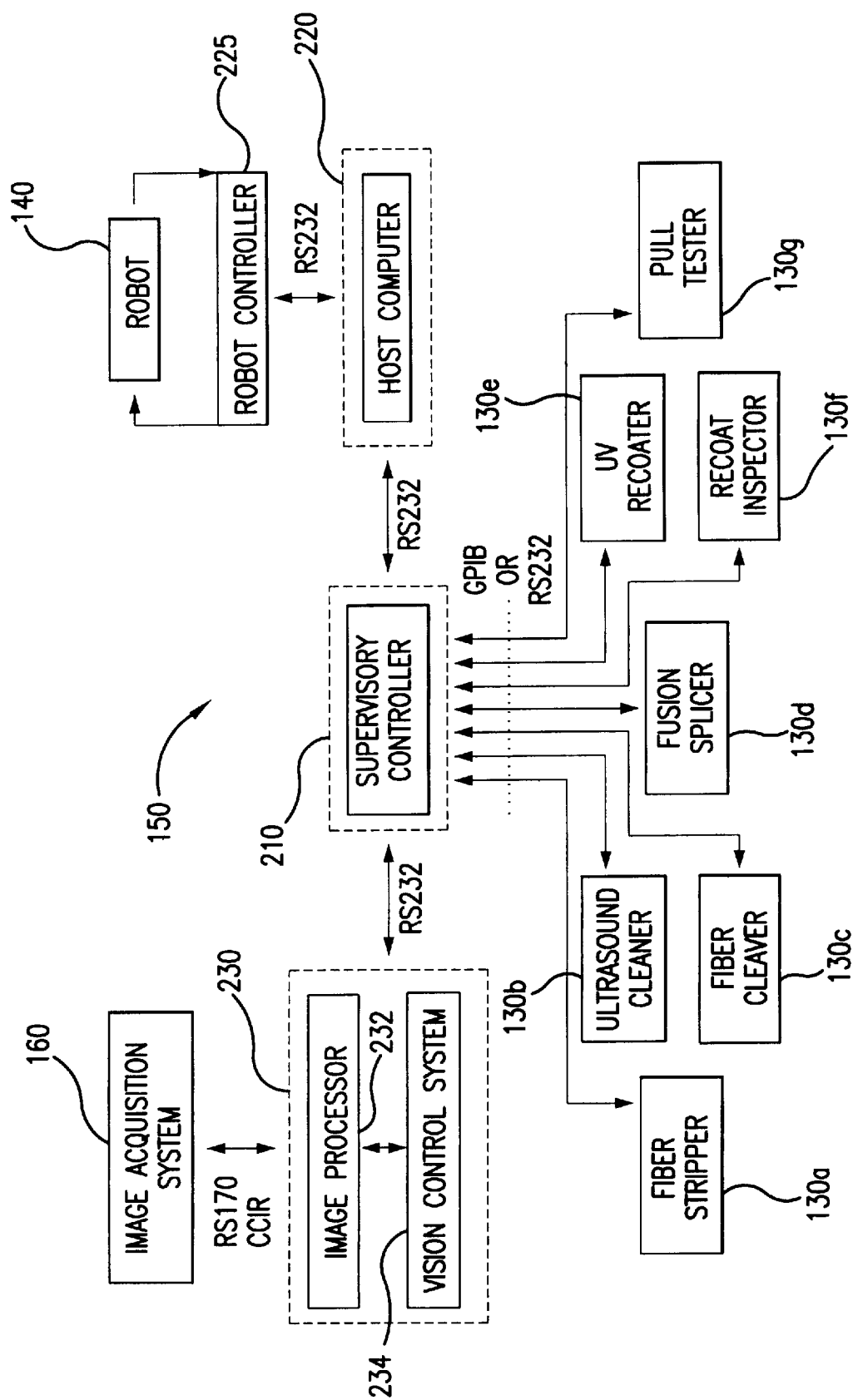
FIG. 2 is a block diagram of a control system for the optical fiber interconnect workstation of FIG. 1.
Figure 5:
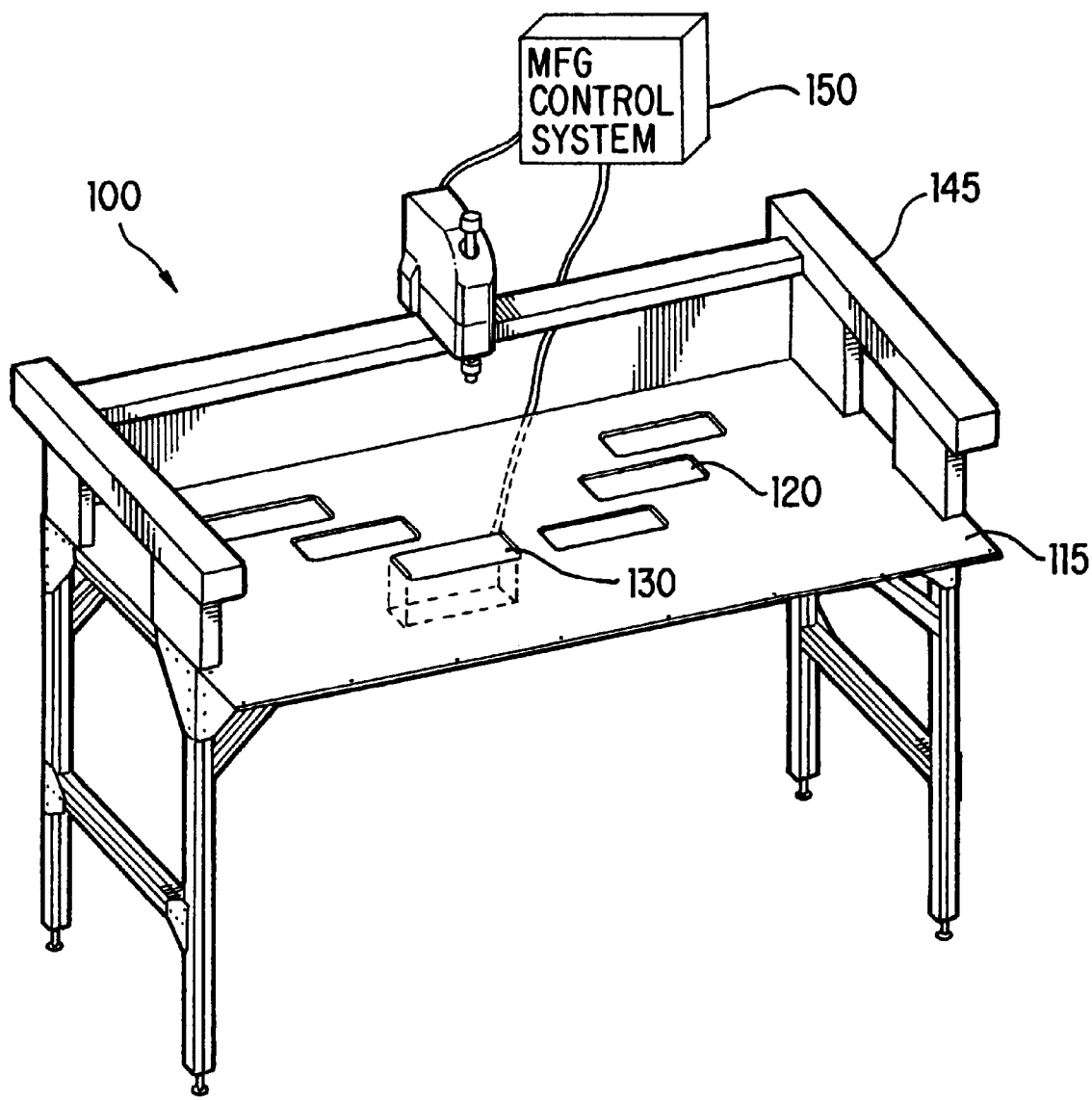
FIG. 5 is a perspective drawing of an integrated and automated optical fiber interconnect workstation illustrating an alternate embodiment of a material transfer mechanism in accordance with the present invention.

A material transfer mechanism, such as robot arm 140, is arranged above the planar surface 115 and is connected to a manufacturing control system 150, a detailed schematic diagram of which is shown in FIG. 2. The robot arm 140 may be selected from any of the commercially available workstation robots. The robot arm 140 should have a work envelope sufficient to cover each of the modules 130 and cycle times that are sufficient so as not to impact the sequence time for the optical interconnect process. Alternatively, a gantry system 145 as shown in FIG. 5 may substituted for the robot arm 140.

An image acquisition system 160 (i.e., a video camera) is incorporated with the optical workstation 100, preferably attached to a portion of the robot arm 140, for guiding and coordinating the movements of the robot arm 140 during the optical fiber interconnection process. The image acquisition system 160 may also be used for quality control, process sequencing, and inspection purposes.

An exemplary manufacturing control system 150 for controlling the modules 130, the robot arm 140, and the image acquisition system 160 of the optical workstation is shown in FIG. 2. While one method of control is shown and described below, one of ordinary skill in the art would realize that any number of module, robot, and image acquisition controlling scenarios may be incorporated within the scope of the present invention. For example, a single computer can be used to centrally control the modules, robot and image acquisition system. Preferably, however, as shown in FIG. 2, a distributed control architecture is provided.

In FIG. 2, the manufacturing control system 150 includes a supervisory controller 210, which is preferably a personal computer system running at least Windows 3.1 or other equivalent controller. The supervisory controller 210, in turn, separately controls the operation of the robot 140, the image acquisition system 160, and the plurality of modules 130 through the distributed control architecture.

Specifically, a separate host computer 220 controls the operation of the robot 140 through a robot controller 225 via a standard RS232 interface. The host computer 220 is preferably a personal computer system running at least Windows 3.1 or other equivalent controller. The host computer 220 and the supervisory controller 210 communicate via a standard RS232 interface.

The image acquisition system 160 is controlled by a separate image processing computer system 230 containing an image processor 232 and vision control system 234. The image processing computer system 230 is preferably a personal computer running at least Windows 95 or Windows NT or other equivalent controller. The image processing computer 230 and the supervisory controller 210 also communicate via a standard RS232 interface. The image acquisition system 160 (i.e., video camera) communicates with the image processing computer 230 via a standard RS170 interface, which is the NTSC (National Television Standards Committee) standard for composite video signals.

Each of the optical processing modules 130 would preferably incorporate an embedded dedicated processor that communicates with the supervisory controller 210 through a standard RS232 or GPIB (General Purpose Interface Bus) interface. Alternatively, the functions of the embedded dedicated processors can be collectively incorporated in a separate computer system to provide the interface between the modules 130 and the supervisory controller 210.

The distributed architecture as shown in FIG. 2 increases the reliability of the manufacturing process by reducing the risk associated with total machine failure. For instance, if any part of the distributed architecture fails, the remaining portions will still work in a semi-automated mode. Also, if a portion of the system is experiencing a problem, troubleshooting, repair or replacement time is significantly decreased. The distributed control system shown in FIG. 2 thus allows for more reliable and efficient control of the simultaneous operations of the modules, robot and image acquisition system. A suitable graphical user interface (GUI) can be incorporated in the supervisory controller 210.

Figure 3:
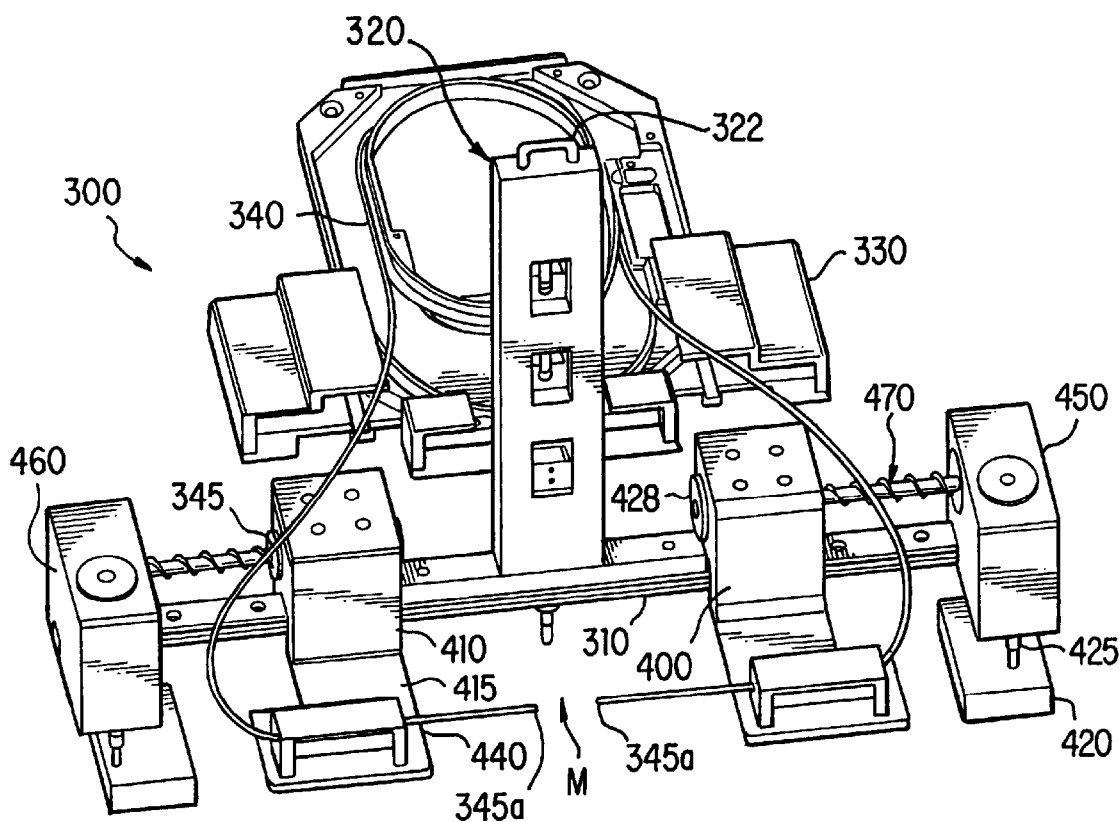
FIG. 3 is a perspective view of an optical fiber precision handling tool which can be used with the present invention.

Referring to FIG. 3, and as described in application Ser. No. 09/017,327, a precision handling tool 300, hereafter referred to as a metrology frame, may be used with the optical workstation 100 of the present invention to hold, transport and align the optical fibers to be connected, and the fiber cassettes from which the optical fibers extend, during an optical fiber interconnection process. The metrology frame 300 includes an elongated lateral rail 310 serving as the attachment point for the majority of the components of the frame. A vertical support member 320 extends from an upper surface of the rail 310. The vertical support member 320 contains an attachment or end effector device 322 to allow the robot arm 140 or gantry system 145 to pick-up and transport the entire metrology frame 300 between the various modules 130 arranged on the planar surface 115.

A plurality of fiber cassette holders 330 are detachably attached to the vertical support member 320 in a substantially horizontal orientation with reference to the vertical support member 320. One of ordinary skill in the art would realize that within the scope of the present invention, many different types of attachment devices may be used to detachably attach the fiber cassette holder 330 to the vertical support member 320.

The ability to accommodate a plurality of fiber cassette holders 330 allows several fiber cassettes 340 to be simultaneously attached to the metrology frame 300. The advantage of providing several fiber cassettes 340 on the metrology frame 300 is that splicing or connecting operations can be serially performed on the optical fibers 345 wound on each of the fiber cassettes 340. Also, in many cases, an optical fiber 345 from one fiber cassette 340 is spliced to an optical fiber 345 of another fiber cassette 340. By having two or more of the fiber cassettes 340 readily available and in the same place, the splicing or connecting operations can be executed more quickly. Moreover, different types of fibers may be wound on respective of the fiber cassettes, thereby allowing for ease of splicing of the different types of fibers.

A pair of aligning brackets 400 and 410 are provided on either side of the vertical support 320. The brackets 400, 410 move or slide laterally along the rail 310 by operation of a drive mechanism as described later. The flange portion 415 of each of the brackets 400, 410 includes an aligning device 440 to align and secure the optical fibers during the interconnecting processes. As shown in FIG. 3, the optical fibers 345 from the fiber cassette 340 are passed through the aligning devices 440. It is understood that any number of conventional or custom aligning mechanisms may be incorporated into the metrology frame 300. Regardless of the aligning device or mechanism employed, it is important that the optical fiber ends 345a be movable toward and away from each other. After the optical fiber ends 345a are aligned by the aligning devices 440, they are in position to undergo the various steps of the fusion or connectorization process between the respective brackets 400, 410 in the area denoted by reference letter M.

A frame leg 450 is attached to one end of the rail 310 and another frame leg 460 is attached to the other end of the rail 310. The frame legs 450, 460 not only provide stability to the rail 310 and the overall frame 300, in this embodiment they house a drive mechanism to move the aligning brackets 400, 410 along the rail 310. The ability to move the brackets 400, 410 along the rail 310 provides a significant amount of flexibility in performing the fusion or connectorization process steps without ever having to remove the optical fibers 345 from the aligning devices 440 on the frame 300. This saves time and reduces the need to manually shift or transfer the optical fibers 345, which results in a quicker fusion or connectorization process with a greatly reduced susceptibility to human error or human variation. Preferably the brackets 400, 410 are independently operable so as to move at different speeds if necessary, for example, to accommodate different rates of stripping for splicing different types of fibers.

In the embodiment of FIG. 3, a worm assembly (not shown) is housed within each of the frame legs 450, 460. The worm assembly has a shaft 425 extending from the bottom surface of the frame legs to contact a motor 420. The motor 420 operates to rotate the shaft 425 about its vertical axis. A lead screw assembly 470 has one end rotatably connected to the motor 420 through the worm assembly, and another end rotatably connected to a threaded opening 428 in the aligning bracket 400, 410.

In operation, the motor 420 rotates the shaft 425 of the worm assembly which rotates the screw assembly 470. The rotation of the screw assembly 470 causes the brackets 400 or 410 to move along the rail 310 as the screw assembly 470 intermeshes with the threaded opening 428. The motor 420 is operative to rotate the shaft 425 in either a clockwise or counter-clockwise manner, so that the brackets 400 or 410 can move either toward or away from each other in the vicinity of the working area M.

Figure 4:
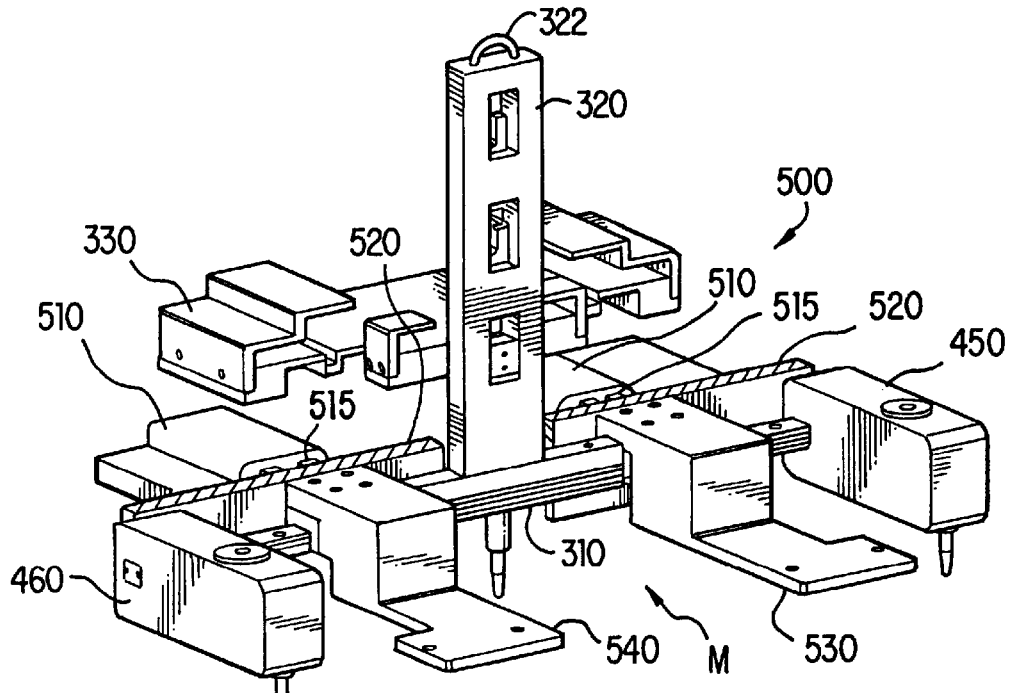
FIG. 4 is a perspective view of another embodiment of an optical fiber precision handling tool which can be used with the present invention.

FIG. 4 illustrates another embodiment of the metrology frame 500 of the present invention in which the worm assembly and motor mechanism of FIG. 1 is replaced by a commercially available piezoelectric motor, specifically a piezo ceramic linear motor. The same reference numerals in FIG. 4 illustrate the same or similar parts as described in FIG. 3. The aligning devices and fiber cassettes have been omitted for simplicity of illustration.

In this embodiment, the piezo motor 510 actuates a plurality of ceramic fingers 515 extending from the piezo motor 510, which ceramic fingers 515 are pressed against a ceramic drive strip 520. The ceramic drive strip 520 is attached by a self-adhesive backing and epoxy to each of the slidable aligning brackets 530, 540. In general operation, application of a voltage to the piezo motor 510 causes the ceramic fingers 515 to oscillate or reciprocate in either a clockwise or counter-clockwise manner, depending on the polarity of the signal pulse. Since the piezo motor 510 is fixed relative to the metrology frame 500, the oscillating motion of the ceramic fingers 515 pressed against the ceramic drive strip 520 causes movement of the ceramic drive strip 520. Note that the movement of the ceramic drive strip 520 results in movement of the aligning brackets 530, 540 to which the ceramic drive strip 520 is attached. Movement of the aligning brackets 530, 540 toward or away from each other is achieved by changing the polarity of the signal pulse, which changes the oscillation direction of the ceramic fingers 515 pressed against the ceramic drive strip 520. Pulse amplitude dictates the velocity of the movement. The ultimate travel distance is governed by the length of the ceramic drive strip 520. This distance would be selected based on the predicted range of travel required by the aligning brackets 530, 540 to execute a fusion or connectorization process.

One of ordinary skill in the art would realize that any number of drive mechanisms can be used to move the aligning brackets relative to each other, whether powered or unpowered. What is important is that the drive mechanism provide precise controlled movement of the aligning brackets.

Having described the metrology frame in some detail, the interaction of the metrology frame and optical workstation of the present invention will now be described. In general, the robot 140 or gantry 145 would be used for a variety of manufacturing tasks, including picking up the metrology frame 300 by its end effector 322, and moving the entire frame 300 between each of the modules 130 to carry out the steps of the interconnect operation (see FIG. 1). Preferably, a plurality of metrology frames 300 are provided to ensure the fusion or connectorization process occurs in a pipelined sequence, to increase the throughput of the optical fiber interconnection process.

For example, referring to FIG. 1 and FIG. 2, if the optical processing modules 130 were configured for a fusion splicing operation, the modules 130 would include a stripping module 130*a* containing a stripping solution into which the optical fiber is dipped to chemically remove the protective coating. Next, the stripped fiber ends are cleaned in an alcohol or other cleaning solution using an ultrasonic cleaner provided in cleaning module 130*b*. In the fiber cleaver module 130*c*, the fiber is cleaved by scribing the fiber with a diamond and carbide scribe to induce a break. The fiber ends then undergo the actual fusion splicing step in module 130*d*. In the splicing module, the motor 420 (or 510) of the metrology frame 300, 500 would move the brackets 400, 410 and aligning devices 440 toward each other in a converging manner (see FIG. 3 or FIG. 4), thereby decreasing the distance between the optical fiber ends and aligning the optical paths of the fibers so as to execute the actual fusion splicing step. After the splicing step, a ultraviolet (UV) recoat step is performed in module 130*e* to cover the exposed stripped and spliced portions of the fiber with a polymer for protection against the outside environment. The UV recoat is inspected in module 130*f*, after which a pull-test is performed on the fibers to test the strength of the splice in a pull-test module 130*g*. In the pull-test module, the motor 420 or 510 would move the brackets 400, 410 and aligning devices 440 away from each other in a diverging manner to test the strength of the splice.

Alternatively, during a connectorization process, the optical processing modules 130 would include at least a connector preparation module, an aligning module, a polishing module, and a testing module.

Regardless of the type of optical fiber interconnect process being performed, the metrology frame 300, 500 would be positioned adjacent to or over a particular module 130 by the robot 140, such that the module working area M of the metrology frame 300, 500 is aligned and engaged with the apparatus in the optical processing module 130 that will execute the particular process step. Thereafter, the designated step of the interconnect operation would be performed on the optical fibers 345 passing through the aligning devices 440 of the metrology frame 300, 500 in the module working area M as shown in FIG. 3. After the step is completed, the robot 140 would move the entire metrology frame 300, 500 to the next module location so that the next step in the interconnect process can be executed. This sequential transfer of the metrology frame 300, 500 among the modules 130 is carried out with a minimum amount of, or ideally, no human intervention, and without ever having to remove and replace the optical fibers 345 from one holding device to another.

Note that the motors 420, 510 as described earlier can be placed in either the individual modules 130 or be integrated into the workstation 100. Also, as described above, the openings 120 and modules 130 are shown in a rectangular form for illustration purposes only, it being understood that any number of module shapes and openings can be employed, depending on the step of the splicing process being performed. Moreover, the exact placement and spacing of the openings 120 in the planar surface 115 can be altered within the scope of the present invention.

As described above, the optical workstation has numerous advantages. The pipelined transfer of the metrology frames among the value adding optical processing modules is carried out with no human intervention and without ever having to remove and replace the optical fibers from one holding device to another. Also, the workstation is easily customized by the orientation and selection of the designated modules. The workstation provides an open architecture, where each module independently performs a step of an optical interconnection process. Therefore, as improvements in certain designs and functions of the modules are realized over time, the outdated version of the module could simply be swapped out for the enhanced version, without significant manufacturing downtime, and without a substantial investment in manpower or funds to implement the enhancement.

Although preferred embodiments of the present invention have been described in detail herein above, it should be clearly understood that many variations and/or modifications of the basic inventive concepts herein taught, which may appear to those skilled in the art, will still fall within the spirit and scope of the present invention as defined in the appended claims and their equivalents.

Having thus described our invention, what we claim as new and desire to secure by Letters Patent is as follows:

1. An apparatus for interconnecting an end portion of a first optical fiber to an end portion of a second optical fiber, said apparatus comprising:

a planar surface having a plurality of openings;

a material transfer mechanism arranged above said planar surface; and a plurality of optical fiber processing modules disposed within respective ones of said plurality of openings, each of said modules being configured to execute a different step of a process for interconnecting said end portions of said first and second fibers; and an optical fiber precision handling tool configured to be attached to said material transfer mechanism for holding, transporting and aligning said end portions of said first and second fibers relative to each other and to said modules.

2. The apparatus of claim 1, wherein said optical fiber interconnection process is a fusion process.

3. The apparatus of claim 2, wherein said modules are selected from a group consisting of a stripping module, a cleaning module, a cleaving module, a splicing module, a ultraviolet (UV) recoat module, and a pull-test module.

4. The apparatus of claim 1, wherein said optical fiber interconnection process is a connectorization process.

5. The apparatus of claim 4, wherein said modules are selected from a group consisting of a connector module, an aligning module, a polishing module, and a testing module.

6. The apparatus of claim 1, further comprising an image processing system connected to said material transfer mechanism.

7. The apparatus of claim 6, further comprising a manufacturing control system for controlling said material transfer mechanism, said image processing system, and each of said modules.

8. The apparatus of claim 7, wherein said manufacturing control system comprises a supervisory controller, a material transfer mechanism computer, and an image processing computer.

9. The apparatus of claim 8, wherein each of said modules is connected to said supervisory controller via a communications link, said material transfer mechanism computer is connected to said supervisory controller via a separate communications link, and said image processing computer is connected to said supervisory controller via a another separate communications link.

10. The apparatus of claim 9, wherein each module executes a step of said optical fiber interconnection process as controlled by said supervisory controller.

11. The apparatus of claim 10, further comprising a loading dock and an unloading dock on a portion of said planar surface.

12. The apparatus of claim 1, wherein said optical fiber precision handling tool comprises a plurality of fiber cassettes, having optical fibers wound thereon, attached to said tool.

13. The apparatus of claim 12, further comprising a plurality of optical fiber precision handling tools, wherein each of said plurality of tools is aligned and engaged with a corresponding module disposed in the opening of the planar surface.

14. The apparatus of claim 13, wherein said optical fibers from said fiber cassettes are threaded through aligning devices in said optical fiber precision handling tool, and said optical fibers remain in said aligning devices while the optical fiber precision handling tool is transferred by the material transfer mechanism among the modules configured to execute said different steps of said optical fiber interconnection process.

15. The apparatus of claim 14, wherein said material transfer mechanism is a robot.

16. The apparatus of claim 14, wherein said material transfer mechanism is a gantry system.

17. An apparatus for interconnecting an end portion of a first optical fiber to an end portion of a second optical fiber, said apparatus comprising:

a planar surface having a plurality of openings;

a plurality of optical fiber processing modules disposed within respective ones of said plurality of openings, each of said modules being configured to execute a different step of a process for interconnecting said end portions of said first and second optical fibers; and at least one optical fiber precision handling tool aligned and engaged with at least one of said modules, said optical fiber precision handling tool being configured for holding, transporting and aligning said end portions of said first and second optical fibers relative to each other and to said modules.

18. The apparatus of claim 17, further comprising a plurality of optical fiber precision handling tools, each aligned and engaged with corresponding of said plurality of modules.

19. The apparatus of claim 18, further comprising a manufacturing control system for controlling the operation of each of said modules.

* * * * *